(12) United States Patent
Lee et al.

(10) Patent No.: US 10,756,400 B2
(45) Date of Patent: Aug. 25, 2020

(54) APPARATUS FOR COOLING BATTERY FOR VEHICLE

(71) Applicants: Hyundai Motor Company, Seoul (KR); Kia Motors Corporation, Seoul (KR)

(72) Inventors: Sang Shin Lee, Gyeonggi-do (KR); Man Ju Oh, Gyeonggi-do (KR); So Yoon Park, Gyeonggi-do (KR); Jae Woong Kim, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 289 days.

(21) Appl. No.: 15/900,246

(22) Filed: Feb. 20, 2018

(65) Prior Publication Data

US 2019/0140329 A1 May 9, 2019

(30) Foreign Application Priority Data

Nov. 6, 2017 (KR) .................. 10-2017-0146759

(51) Int. Cl.
| | |
|---|---|
| *H01M 10/6556* | (2014.01) |
| *H01M 10/613* | (2014.01) |
| *H01M 10/625* | (2014.01) |
| *H01M 10/6567* | (2014.01) |
| *B60H 1/00* | (2006.01) |

(52) U.S. Cl.
CPC .... *H01M 10/6556* (2015.04); *B60H 1/00278* (2013.01); *B60H 1/00321* (2013.01); *H01M 10/613* (2015.04); *H01M 10/625* (2015.04); *H01M 10/6567* (2015.04); *B60H 2001/00307* (2013.01); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0263708 | A1* | 10/2009 | Bender | H01M 2/105 429/120 |
| 2010/0307723 | A1* | 12/2010 | Thomas | B60H 1/00278 165/104.33 |
| 2011/0206966 | A1* | 8/2011 | Schmid | H01M 6/5038 429/120 |
| 2016/0372805 | A1* | 12/2016 | Kim | H01M 10/6556 |

FOREIGN PATENT DOCUMENTS

| | | |
|---|---|---|
| JP | 2009-073430 A | 4/2009 |
| JP | 2014-060088 A | 4/2014 |
| KR | 10-2012-0066340 | 6/2012 |
| KR | 2016-0034357 A | 3/2016 |
| KR | 2016-0034674 A | 3/2016 |
| KR | 2016-0048564 A | 5/2016 |

\* cited by examiner

*Primary Examiner* — Christopher P Domone
(74) *Attorney, Agent, or Firm* — Mintz Levin Cohn Ferris Glovsky and Popeo, P.C.; Peter F. Corless

(57) ABSTRACT

An apparatus for cooling a battery for a vehicle is provided. The apparatus includes a battery module for a vehicle and a body that is disposed adjacent to the battery module. The body has a circulation space formed therein to allow heat generated in the battery module to circulate in the circulation space and thus be absorbed by the body. Additionally, a cooling part is disposed to exchange heat with the body to thus cool the battery module is introduced.

9 Claims, 9 Drawing Sheets

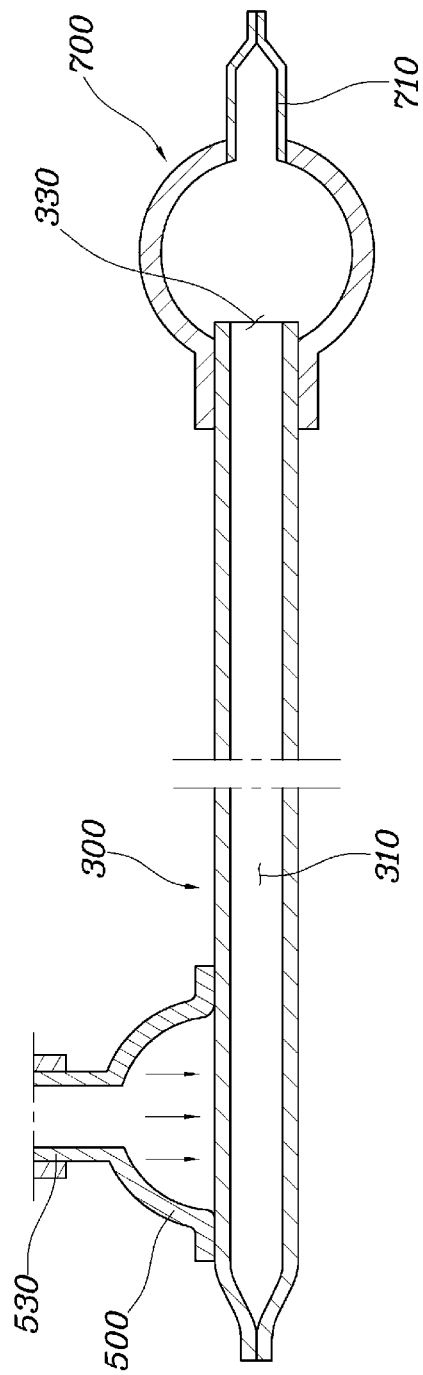

APPARATUS FOR COOLING BATTERY FOR VEHICLE

CROSS REFERENCE TO RELATED APPLICATION

The present application claims priority to Korean Patent Application No. 10-2017-0146759 filed on Nov. 6, 2017, the entire contents of which are incorporated herein for all purposes by this reference.

BACKGROUND

1. Field of the Disclosure

The present disclosure relates to a vehicular battery cooling apparatus that efficiently cools a battery module including a high-voltage battery in a vehicle in which the high-voltage battery is mounted.

2. Description of the Prior Art

An electric vehicle, in which a battery module for providing a driving energy to the vehicle is mounted, obtains driving energy from electric energy instead of combustion of fossil fuel from which a conventional vehicle obtains driving energy. Additionally, an electric vehicle discharges no exhaust gas and generates minimal noise. However, several problems including the substantial weight of the battery thereof and the time required for charging the battery have disturbed commercialization of the electric vehicle. Recently, development of the electric vehicle is being accelerated again due to problems, such as increasing pollution and depletion of fossil fuel. In particular, for commercialization of an electric vehicle, the time required to charge a battery module of the vehicle needs to be reduced, which is a source for fuel supply to the vehicle, and the weight and volume of the battery also require reduction. In this regard, active research regarding the battery module is being conducted.

The battery module includes a plurality of battery cells that are connected in series. Further, for efficient charging or discharging of the battery module, the battery module should be maintained at a proper temperature. Therefore, an electric vehicle includes a temperature control system for monitoring a battery module in real time according to an environment, such as an outdoor environment or a driving environment, to cool or heat the battery module. However, in a conventional vehicular battery temperature control system, one radiator is shared by a battery module and an electronic component core. Therefore, there has been a limitation in use of the conventional vehicular battery temperature control system due to the different temperature ranges in which the battery module and the electronic component core mainly operate, respectively. Moreover, the conventional vehicular battery temperature control system is installed adjacent to devices for air-conditioning a passenger compartment, thereby reducing the thermal efficiency.

The foregoing description of the background art is merely for the purpose of promoting understanding of the background of the present disclosure and should not be construed as an admission that the description is a prior art which is already known to a person skilled in the art.

SUMMARY

An aspect of the present disclosure is to provide a vehicular battery cooling apparatus, which reduces the weight of a vehicle and also reduces the power consumption of a water pump to increase the power performance of the vehicle.

In accordance with the above aspect, an apparatus for cooling a battery for a vehicle may include: a battery module for a vehicle; a body, which is disposed adjacent to the battery module and has a circulation space formed therein to allow heat generated in the battery module to circulate in the circulation space and thus be absorbed by the body; and a cooling part disposed to exchange heat with the body, to cool the battery module.

Fluid may be filled and may circulate in the circulation space of the body while exchanging heat with the cooling part and the battery module. A first side of the body may be closed and a second side thereof may be open, and a closing part may be disposed at the second side of the body to cover the open second side of the body, so that the body is closed and a predetermined pressure is maintained in the body. A pressure approximate to a vacuum pressure may be maintained in the body by the closing part.

The circulation space may be formed with a length of the circulation space greater than a width thereof, and a lengthwise direction of the circulation space may be about the same as a lengthwise direction of the battery module. The circulation space may be partitioned into a plurality of sections and a transfer member may be disposed between sections of the circulation space. A transfer member may be disposed on an inner surface of the body to assist movement of fluid filled in the circulation space.

One side of the body may be inserted through the cooling part to allow the body and the cooling part to be in surface contact with each other. The cooling part may be disposed on one side of the body, and the body and the cooling part may be in surface contact with each other. An insertion groove may be formed on the cooling part and one side of the body may be inserted in the insertion groove to allow the body and the cooling part to be in surface contact with each other. The cooling part may include a cooling water tank which is connected to an air-conditioning line of a vehicle and stores cooling water.

A vehicular battery cooling apparatus having the construction described above may reduce the quantity of cooling water to thus reduce the weight thereof, reduce the power consumption of a water pump to thus increase the power performance of the vehicle, and remove the possibility of direct contact between a high-voltage battery and cooling water to thus remove the possibility of fire due to leakage of the cooling water, thereby increasing the safety.

BRIEF DESCRIPTION OF THE DRAWINGS

The above and other aspects, features and advantages of the present disclosure will be more apparent from the following detailed description taken in conjunction with the accompanying drawings, in which:

FIG. 9 is a sectional view taken along line D-D of FIG. 8 according to the fifth exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a vehicular battery cooling apparatus according to an exemplary embodiment of the present disclosure will be described with reference to the accompanying drawings.

Figure 1:
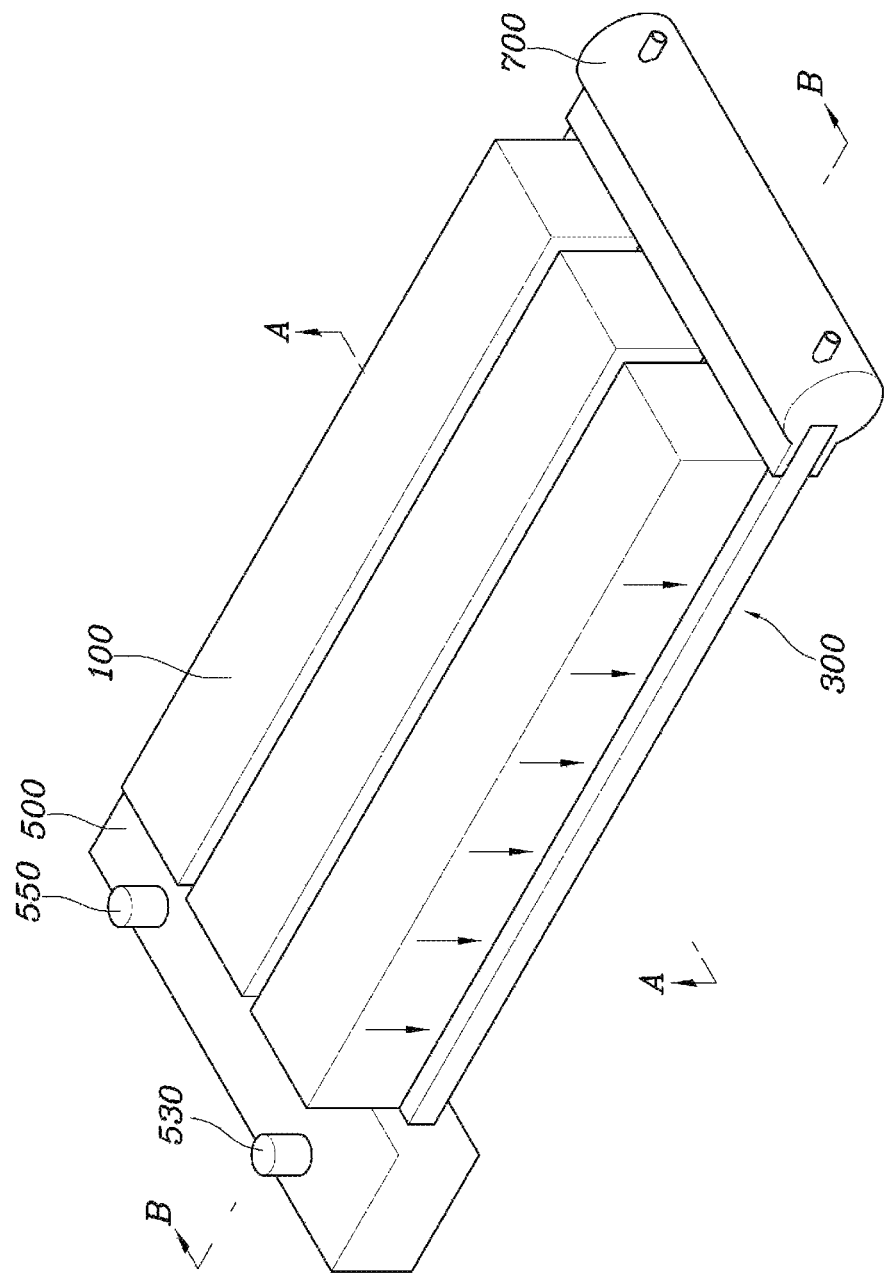
FIG. 1 is a perspective view of a vehicular battery cooling apparatus according to a first exemplary embodiment of the present disclosure.
Figure 2:
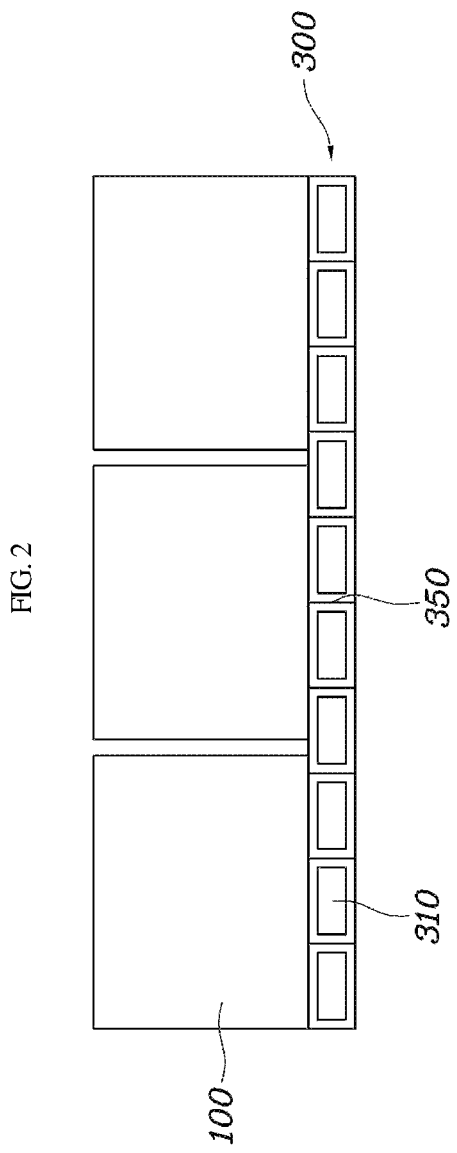
FIG. 2 is a sectional view taken along line A-A of FIG. 1 according to the first exemplary embodiment of the present disclosure.
Figure 3:
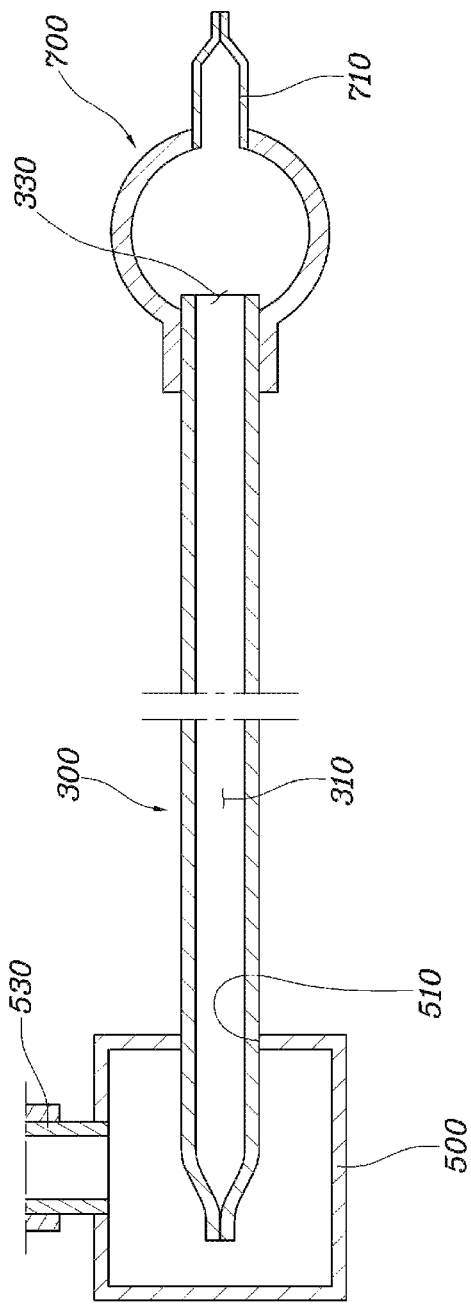
FIG. 3 is a sectional view taken along line B-B of FIG. 1 according to the first exemplary embodiment of the present disclosure.
Figure 4:
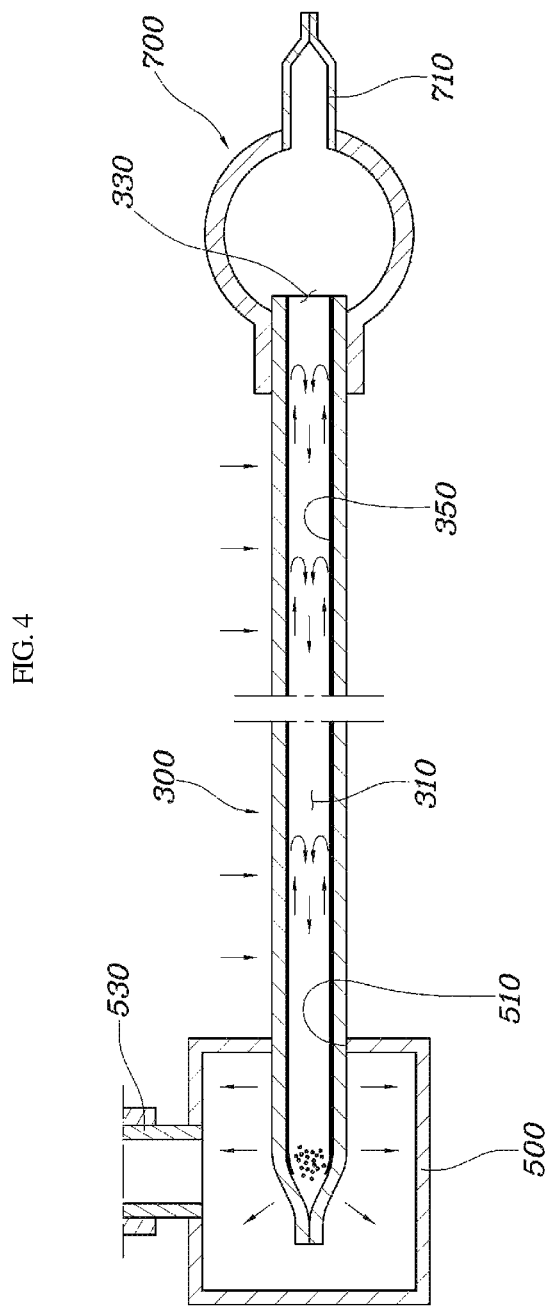
FIG. 4 is a sectional view of a vehicular battery cooling apparatus according to a second exemplary embodiment of the present disclosure.
Figure 5:
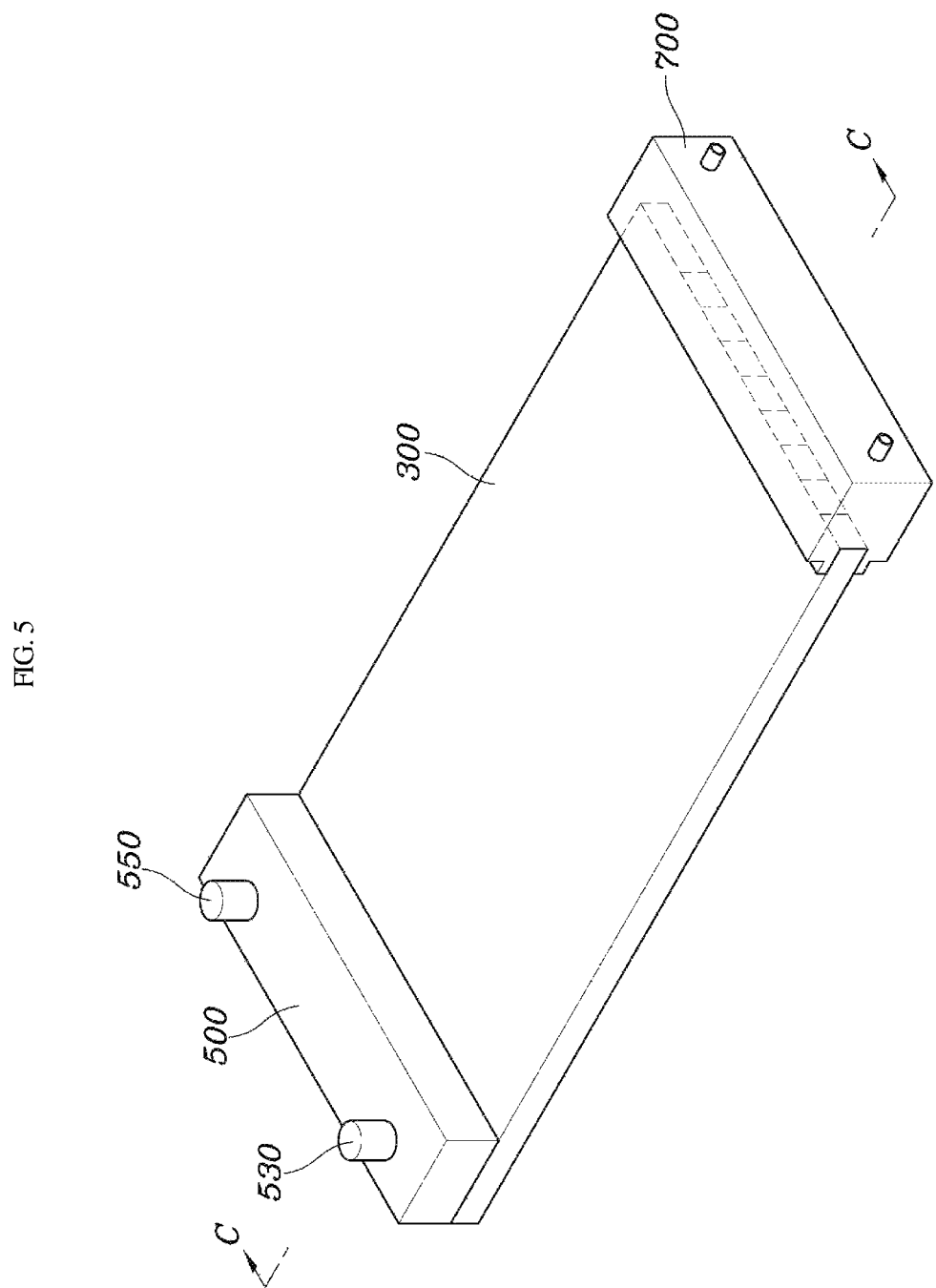
FIG. 5 is a perspective view of a vehicular battery cooling apparatus according to a third exemplary embodiment of the present disclosure.
Figure 6:
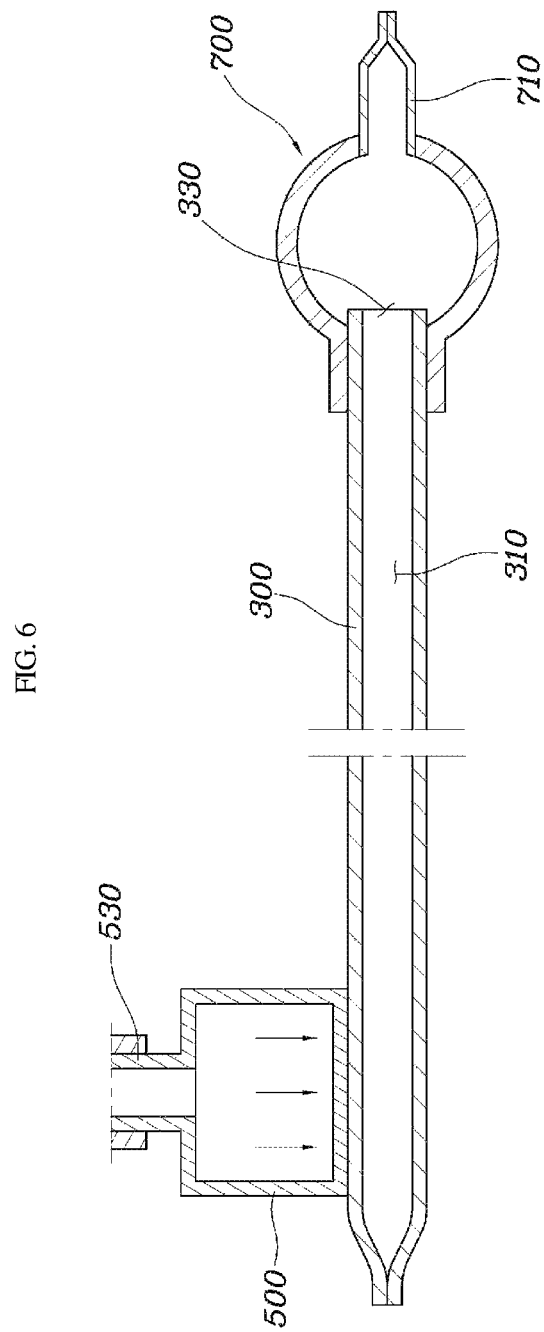
FIG. 6 is a sectional view taken along line C-C of FIG. 5 according to the third exemplary embodiment of the present disclosure.
Figure 7:
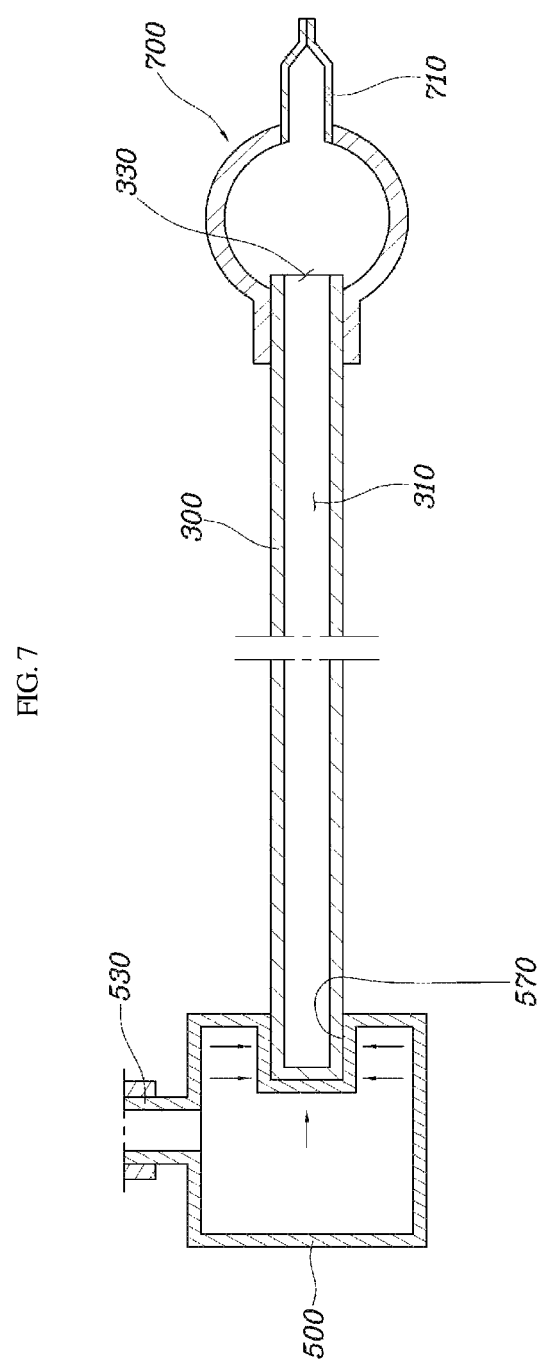
FIG. 7 is a sectional view of a vehicular battery cooling apparatus according to a fourth exemplary embodiment of the present disclosure.
Figure 8:
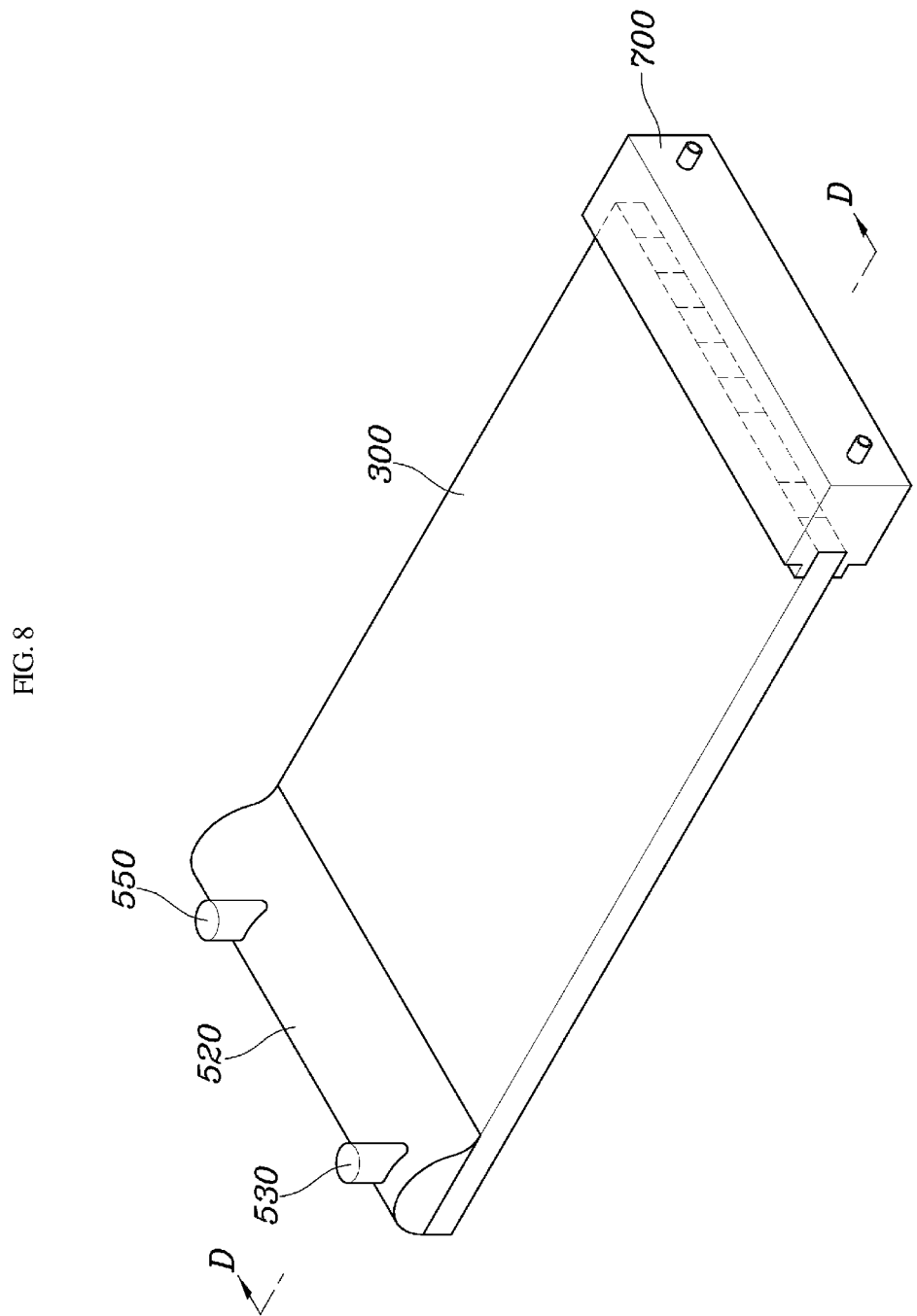
FIG. 8 is a perspective view of a vehicular battery cooling apparatus according to a fifth exemplary embodiment of the present disclosure.

FIG. 1 is a perspective view of a vehicular battery cooling apparatus according to an exemplary embodiment of the present disclosure, FIG. 2 is a sectional view taken along line A-A of FIG. 1, FIG. 3 is a sectional view taken along line B-B of FIG. 1, FIG. 4 is a sectional view of a vehicular battery cooling apparatus according to a second exemplary embodiment of the present disclosure, FIG. 5 is a perspective view of a vehicular battery cooling apparatus according to a third exemplary embodiment of the present disclosure, FIG. 6 is a sectional view taken along line C-C of FIG. 5, FIG. 7 is a sectional view of a vehicular battery cooling apparatus according to an exemplary fourth embodiment of the present disclosure, FIG. 8 is a perspective view of a vehicular battery cooling apparatus according to a fifth exemplary embodiment of the present disclosure, and FIG. 9 is a sectional view taken along line D-D of FIG. 8.

A vehicular battery cooling apparatus according to an exemplary embodiment of the present disclosure may include: a battery module 100 for a vehicle; a body 300, which is disposed adjacent to the battery module 100 and has circulation spaces 310 formed therein to allow heat generated in the battery module 100 to circulate in the circulation spaces 310 and thus be absorbed by the body; and a cooling part 500 disposed to exchange heat with the body 300, to cool the battery module 100.

The inventive vehicular battery cooling apparatus, which absorbs heat generated in a high-voltage battery installed to a vehicle to cool the battery and thus enhance the efficiency of the battery, may be applied especially to an electric vehicle having a high-voltage battery installed thereto. Although the battery module 100 exemplarily described and illustrated in the present specification is located at the side of a floor panel of the vehicle, the location of the battery module is not limited to this position.

Furthermore, the body 300 may be disposed adjacent to the battery module 100 and may be a heat pipe. The body 300 may include circulation spaces 310 formed therein, and fluid may be filled and circulate in the circulation spaces 310 while absorbing heat generated in the battery module 100 to allow heat exchange with the cooling part 500. In particular, a first side of the body 300 may be closed while a second side thereof (e.g., an opposite side) is open. Further, a closing part 700 may be disposed to cover the second side of the body 300, i.e. the open side 330 thereof. As a result, the body 300 is closed and the inside of the body 300 may be maintained at a predetermined pressure. The inside of the body 300 may be maintained at a pressure that is approximately a vacuum pressure. The closing part 700 may include a closing protrusion 710, which makes it possible to perform a labor of forming a pressure close approximate to a vacuum pressure in the circulation spaces 310 and then permanently close the spaces.

The circulation spaces 310 formed in the body 300 may have a length greater than a width thereof. In particular, the circulation spaces 310 may be formed with the lengthwise direction of the circulation spaces 310 about the same as the lengthwise direction of the battery module 100, to allow fluid to circulate in the circulation spaces 310 and enable heat exchange between the battery module 100 and the cooling part 500. The circulation spaces 310 may be partitioned from each other and a transfer member 350 may be disposed between a first circulation space 310 and a second circulation space 310. Further, the transfer member 350 may be formed to be in tight contact (e.g., abutting) with an inner surface of the body 300. Therefore, the transfer member 350 facilitates movement of the fluid filled in the circulation spaces 310 to enable more efficient fluid movement.

The cooling part 500 may be disposed to exchange heat with the body 300, to indirectly cool the battery module 100.

Particularly, the cooling part 500 may be a part of a cooling water channel or a cooling water tank which is connected to an air-conditioning line of a vehicle and contains cooling water. The cooling part 500 may be disposed at one side of the body 300, especially at the side opposite to the open side 330 of the body 300.

Hereinafter, the cooling part 500 will be described in detail with reference to the drawings. First, FIGS. 1 to 3 illustrate the first exemplary embodiment of the present disclosure, wherein one side of the body 300 is inserted through the cooling part 500 so that the body 300 and the cooling part 500 are in surface contact with each other. The cooling part 500 may be formed in a cooling water channel of a vehicle, and thus may include an inlet port 530 through which cooling water is introduced from the cooling water channel and a discharge port 550 through which the introduced cooling water is discharged. The cooling part 500 corresponds to a space in which the cooling water is temporarily stored while flowing, and has a coupling aperture 510 into which one side of the body 300 may be inserted. The body 300 may be inserted through the coupling aperture 510. Therefore, the outermost surface of the body 300 along one side of the body 300 is in surface contact with the cooling water in the cooling part 500, and the heat transferred from the battery module 100 may be cooled through heat exchange with the cooling water of the cooling part 500.

FIG. 4 illustrates the second exemplary embodiment of the present disclosure, which has the same configuration as that of the first exemplary embodiment, except that the transfer member 350 is arranged on the inner surface of the circulation space 310 to help fluid circulate in the circulation spaces 310, thereby improving the cooling efficiency. FIGS. 5 and 6 illustrate the third exemplary embodiment of the present disclosure and FIGS. 8 and 9 illustrate the fifth exemplary embodiment of the present disclosure, wherein the cooling part 500 is disposed at an outside of the body 300 and the body 300 and the cooling part 500 are in surface contact with each other. The third fourth exemplary embodiments are the same in view of the purpose for increasing the contact surface, differing only in the shape of the cooling part 500. Therefore, the cooling water in the cooling part 500 and the battery module 100 exchange heat through the body 300, to cool the battery module 100.

FIG. 7 illustrates the fourth exemplary embodiment of the present disclosure, wherein an insertion groove 570 in which the body 300 is inserted is formed on the cooling part 500 and one side of the body 300 is inserted in the insertion groove 570, so that the cooling part 500 and the body 300 are in surface contact with each other.

Moreover, heat exchange in the exemplary embodiments described above will be described with reference to FIG. 4. In particular, heat is transferred from the battery module 100 to the body 300. Since the cooling part 500 is disposed at one side of the body 300 (e.g., a first side), fluid within the circulation space 310 of the body located at the side of the cooling part 500 is condensed by the cooling water, and the condensed fluid moves to the other side of the body 300 (e.g., a second side) along the inner surface of the circulation space 310. During the movement, the transfer member 350 may facilitate the movement of the condensed fluid. The condensed fluid moving in the circulation space 310 is evaporated by the heat transferred from the battery module 100, and the evaporated fluid moves to the cooling part 500 along the inside of the circulation space 310 while exchanging heat.

Therefore, a vehicular battery cooling apparatus having the construction described above may reduce the quantity of cooling water to thus reduce the weight thereof, reduce the power consumption of a water pump to thus increase the power performance of the vehicle, and remove the possibility of direct contact between a high-voltage battery and cooling water to thus remove the possibility of fire due to leakage of the cooling water, thereby increasing the safety.

Although the present disclosure has been shown and described with respect to specific exemplary embodiments thereof, it will be apparent to a person skilled in the art that various modifications and variations may be made in the present disclosure without departing from the technical idea of the present disclosure, which is provided by the following claims.

What is claimed is:

1. An apparatus for cooling a battery for a vehicle, comprising:
    a battery module for the vehicle;
    a body disposed adjacent to the battery module and having a circulation space formed therein to allow heat generated in the battery module to circulate in the circulation space and be absorbed by the body; and
    a cooling part disposed to exchange heat with the body to cool the battery module,
    wherein a first side of the body is closed and a second side of the body is open, and a closing part is disposed at the second side of the body to cover the open second side of the body, and
    wherein the closing part includes a closing protrusion to form a pressure approximate to a vacuum pressure in the circulation space.

2. The apparatus of claim 1, wherein fluid is filled in and circulates within the circulation space of the body while exchanging heat with the cooling part and the battery module.

3. The apparatus of claim 1, wherein the circulation space is formed with a length of the circulation space is greater than a width thereof, and a lengthwise direction of the circulation space is about equal to a lengthwise direction of the battery module.

4. The apparatus of claim 1, wherein the circulation space is partitioned into a plurality of sections and a transfer member is disposed between sections of the circulation space.

5. The apparatus of claim 1, wherein a transfer member is disposed on an inner surface of the body and facilitates movement of fluid filled in the circulation space.

6. The apparatus of claim 1, wherein a first side of the body is inserted through the cooling part to allow the body and the cooling part to be in surface contact with each other.

7. The apparatus of claim 1, wherein the cooling part is disposed on a first side of the body, and the body and the cooling part are in surface contact with each other.

8. The apparatus of claim 1, wherein an insertion groove is formed on the cooling part and a first side of the body is inserted in the insertion groove to allow the body and the cooling part to be in surface contact with each other.

9. The apparatus of claim 1, wherein the cooling part includes a cooling water tank which is connected to an air-conditioning line of the vehicle and stores cooling water.

* * * * *